United States Patent Office 3,399,923
Patented Sept. 3, 1968

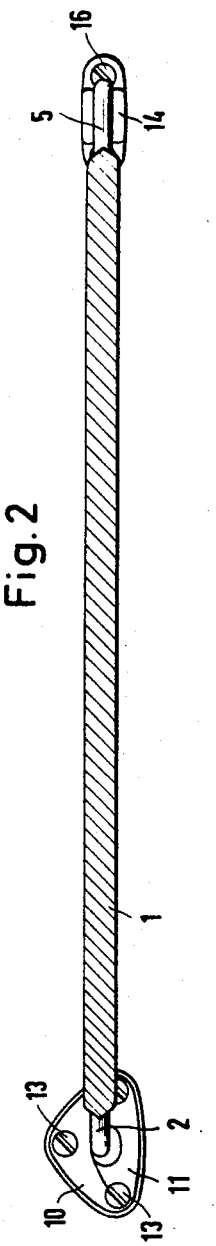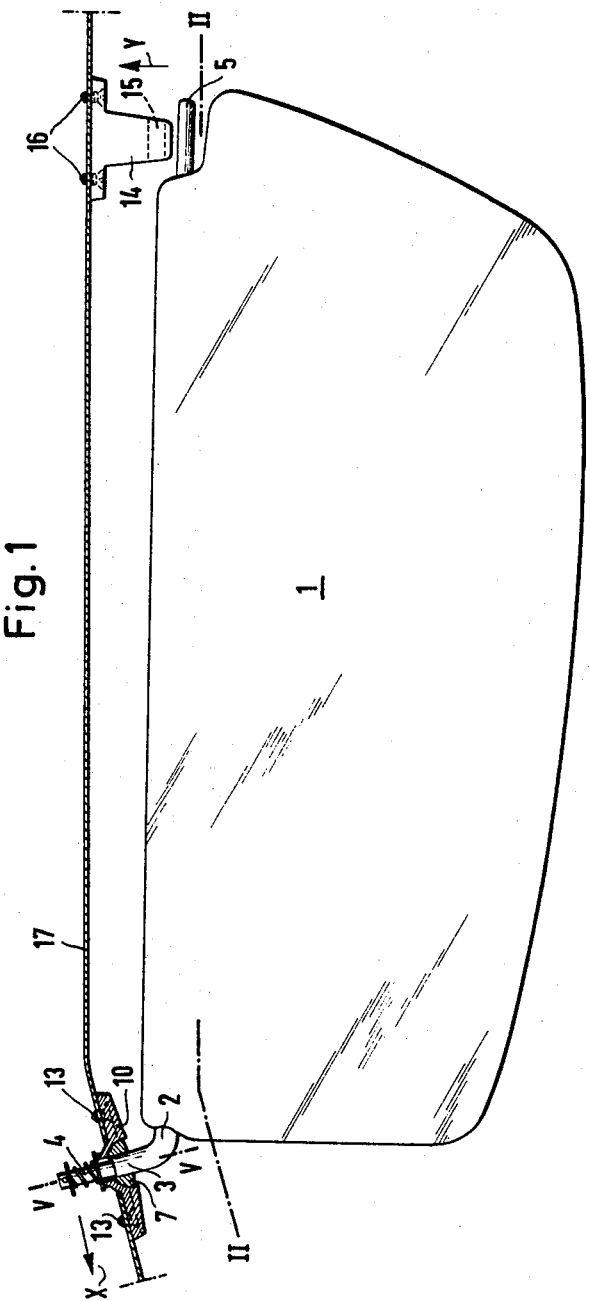

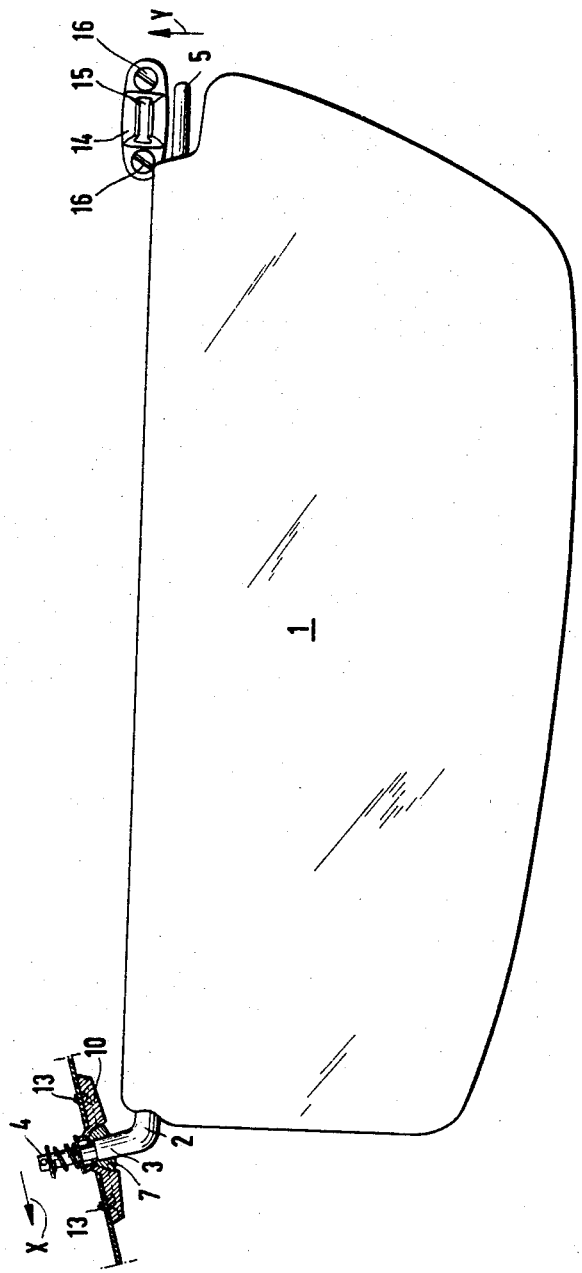

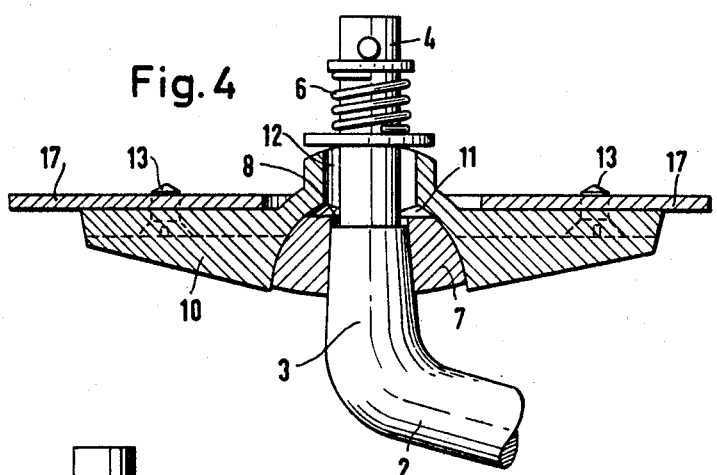
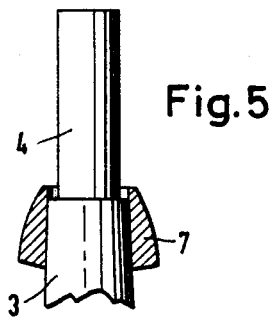
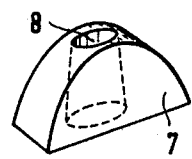
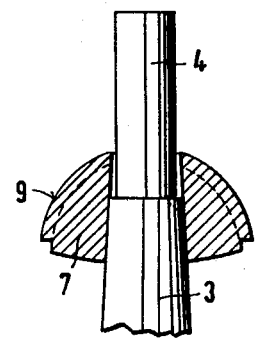
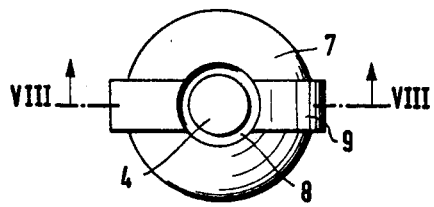
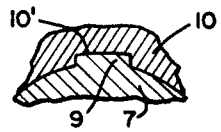

3,399,923
PIVOTED LIGHT SHIELD AND SNAP-ACTION AUXILIARY RETAINER
Heinz Bornefeld, Kriegerheimstr. 77, Wuppertal-Elberfeld, Germany, and Kurt Cziptschirsch, Am Heckendorn 43, Wuppertal-Barmen, Germany
Filed Jan. 13, 1966, Ser. No. 520,524
Claims priority, application Germany, May 29, 1965, H 52,112
6 Claims. (Cl. 296—97)

ABSTRACT OF THE DISCLOSURE

A light shield assembly, especially designed for use in motor vehicles, comprising a light shield mounted, along one edge thereof, upon a shaft, one end of which shaft is bent from the main portion of said shaft and forms a journal about which the main portion rotates, a pivot bearing rigidly secured to a fixed vehicle part, a trunnion in the form of a solid of revolution, said trunnion rotatably engaging said pivot bearing, and an auxiliary retainer rigidly secured to a fixed vehicle part and positioned to receive, in a bore therein, the free end of the light shield shaft. The journal of said shaft is rotatably mounted within the trunnion and the trunnion is constrained to rotate, relative to the pivot bearings, in a single plane, which plane is defined by a line coinciding with the axis of the journal and the center line of the bore in said auxiliary retainer. The bore of the auxiliary retainer is provided with an entrance slot and according to one embodiment of the present invention, the entrance slot lies within the plane of rotation of the trunnion relative to the pivot bearing. According to a second embodiment of the present invention, the entrance slot lies within a plane at right angles to the plane of rotation of the trunnion relative to the pivot bearing.

This invention relates to a light shield, which is preferably intended for vehicles and comprises a shaft, one end portion of which is bent from the axis to form a journal and rotatably mounted in a pivot bearing, whereas the other end of the shaft is adapted to snap into an auxiliary retainer. The shaft must be supported at both ends to prevent an undue vibration of the free end of the long shield under the action of vibrations of the moving vehicle. The free end of the shaft, which is directed toward the center of the vehicle, must be removably mounted in an auxiliary retainer to enable a pivotal movement of the light shield with its shaft through about 90° from the windshield to the lateral door window.

In a light shield of this type, a satisfactory engagement of the free end portion of the shaft with the bore of the auxiliary retainer is possible only if the pivotal movement of the end portion of the shaft adjacent to the auxiliary retainer takes place in the plane of symmetry of the auxiliary retainer, which plane extends through the bore. Thus, the pivot bearing and auxiliary retainer must be very closely matched. In practice, the metal of the vehicle body may differ in shape and/or size at the mounting surfaces for the pivot bearing or for the auxiliary retainer. These differences may arise during the manufacture or may be the result of distortions which develop during the use of the vehicle or as a result of accidents. A small dislocation of the portion on which the pivot bearing is mounted, resulting in a slight displacement of the axis of rotation of the journal, will cause a very large, undesired deflection of the shaft of the shield from its prescribed direction and owing to the great length of the shaft this deflection has such a great effect on the free end of the shaft that this free end cannot be engaged with the auxiliary retainer unless a considerable stress is set up. This stress tends to disengage the shaft of the shield from the auxiliary retainer under the action of the inevitable vibrations of the moving vehicle.

To eliminate this disadvantage, it is a suggestion of the present invention to design the pivot bearing so that the journal is rotatable in a solid of revolution, which is rotatable relative to the stationary pivot bearing only in one plane, which is determined by the journal and the center line of the bore of the auxiliary support, which line intersects the axis of said journal.

If the journal is rotatable only about a fixed axis, a rotation of the journal about this fixed axis will result in a movement of the free end of the shaft of the shield along a circle in a plane which is at right angles to the plane defined by the journal and the shaft of the shield in any phase of the movement. Thus, the rotation of the shaft of the shield about the fixed axis takes place in a direction which is at right angles to the plane defined by the shaft of the shield and the journal. If the journal is rotatable relative to the pivot bearing also in the plane, as is the case according to the present invention, the free end of the shaft of the shield can be introduced into the bore of the auxiliary retainer without setting up a stress, independently of the side to which the entrance slot of said bore is directed, because the free end of the shaft of the shield is movable on two planes, which are at right angles to each other so that the shaft can move in any direction within the range of its rotational and pivotal movements.

As the shaft of the shield can perform only a pivotal movement about the axis of the journal and a rotational movement in only one plane, the position of the journal mounted in the solid of revolution can also be changed only by a rotational movement in a single plane. This affords the advantage that the position of the shaft of the shield engaged with the auxiliary retainer cannot be changed in an undesired direction by a rotational movement so that the shield panel when moved to a certain position cannot depart from this position.

In a preferred embodiment of the invention, the journal is rotatable in a solid of revolution, which is rotatable relative to the stationary pivot bearing only in one plane, which is defined by the plane of symmetry of the bore of the auxiliary retainer with entrance slot. This affords the advantage that a mere sequence of a strictly pivotal movement and a strictly rotational movement of the shaft of the shield causes the free end of said shaft to engage the bore of the auxiliary retainer.

The solid of revolution may consist, e.g., of an ellipsoid of revolution or a circular cylinder or of a portion thereof. Alternatively, the solid of revolution may have a rib, which is guided in a suitably shaped annular groove of the pivot bearing. All these solids of revolution have a compact structure and the advantage that they are held in the pivot mounting by the journal, without need for additional fastening means. Besides, they conform to the contour lines of the pivot bearing on the side facing the shaft of the shield in the installed condition of the solid of revolution and are rounded so that a good appearance is obtained and there is no risk of injury caused by the bearing components.

Illustrative embodiments of the innovation are shown in the drawing, in which

FIG. 1 shows on a reduced scale a light shield, which is secured to a mounting wall and has a journal which is pivotally and rotationally mounted in a bearing according to the innovation, which is shown in section. The light shielded is shown before the engagement of its free shaft end with the bore of an auxiliary retainer. The plane of symmetry of the bore of the auxiliary retainer with entrance slot coincides with the plane of the rotational movement of the solid of revolution.

FIG. 2 is a sectional view taken on line II—II of FIG. 1.

FIG. 3 shows on a reduced scale a light shield which is designed and mounted according to FIG. 1 with the plane of symmetry of the bore of the auxiliary retainer with entrance slot extending at right angles to the plane of the rotational movement of the solid of revolution.

FIG. 4 is an enlarged view showing the pivot bearing which is mounted on the mounting wall as well as the journal and solid of revolution.

FIG. 5 is a sectional view taken on line V—V of FIG. 1 and shows the journal and solid of revolution of FIG. 4.

FIG. 6 is an enlarged perspective view showing another embodiment of the solid of revolution designed as one half of a circular cylinder.

FIG. 7 is an enlarged top plan view showing another embodiment of the solid of revolution in the form of a hemisphere having a guide rib.

FIG. 8 is an enlarged elevation view, partly in section, showing the solid of revolution of FIG. 7.

FIG. 9 illustrates an enlarged sectional view of the solid of revolution according to FIGS. 7 and 8, having a rib 9 engaging in an annular groove 10' of the pivot bearing 10.

The shield panel 1 of the light shield is rotatably connected to a shaft 2, one end portion of which is bent from the axis of the shaft and forms a journal 3, which is mounted in a pivot bearing 10. The other end portion 5 of the shaft is engageable with an auxiliary retainer 14.

The tapered journal 3 enters the correspondingly tapered bore 8 of a solid of revolution 7. A helical compression spring 6 bears at one end on the cylindrical end portion 4 of the journal 3 and at the other end on the outer rim of the flared opening 12 of the pivot bearing 10 and pulls the journal 3 into the bore 8. By this tension exerted on the journal 3, the solid of revolution 7 is urged against the wall of the bearing shell 11 so that a braking friction is obtained between this shell and the solid of revolution 7 in dependence on the pressure of the helical compression spring 6.

The pivot bearing 10 and the auxiliary retainer 14 are connected to the mounting wall 17 by the screws 13 and 16.

The solid of revolution 7 is rotatable relative to the stationary pivot bearing 10 only in a single plane. The range of this rotational movement is determined by the freedom of movement of the cylindrical journal end portion 4 in the flared opening 12.

In the light shield shown in FIGS. 1 and 3, the solid of revolution 7 consists of a body which has the form of an ellipsoid of revolution where it contacts the bearing shell 11 whereas it is elliptically flattened on the non-contacted side facing the shield panel 1. This is particularly clearly apparent from FIGS. 4 and 5.

According to FIG. 6, the solid of revolution 7 has the form of one half of a circular cylinder. Just as the ellipsoid of revolution, this cylinder may be defined on the side facing the shield panel 1 by an elliptically curved surface rather than by a plane surface.

In FIGS. 7 and 8, the solid of revolution 7 consists of a segment of a sphere, which has a rib 9, which is guided in a correspondingly shaped annular groove 10' (in FIGURE 9) of the pivot bearing 10.

According to FIG. 1, a movement of the shield panel 1 from the effective position in which it is shown in the direction of the arrow Y, so as to enable an engagement of the free end portion 5 of the shaft with the slotted bore 15 of the auxiliary retainer 14, can be effected by a rotation of the shield panel 1 about the axis of rotation of the solid of revolution 7 in the direction of the arrow X.

According to FIG. 3, the auxiliary retainer 14 is arranged so that its plane of symmetry extends through the bore 15 and at right angles to the plane in which the solid of revolution 7 is rotatable. For this reason, the free end portion 5 of the shaft cannot be directly moved from the illustrated position into the bore 15 of the auxiliary retainer 14 by a mere rotation of the shield panel 1 in the direction of the arrow Y, as is possible in FIG. 1. Such a rotational movement will move the end portion 5 of the shaft into the above-mentioned plane of symmetry of the auxiliary retainer 14 immediately before the bore 15 thereof and must be succeeded by a pivotal movement of the shield panel 1 about the journal 3 so that the end portion 5 of the shaft can be engaged with the bore 15.

What is claimed is:

1. A light shield assembly, especially for use in vehicles, comprising:
   a light shield, one edge of which is adapted to engage a shaft and be secured thereon,
   a shaft, one end of which is bent from the axis of the main portion thereof, thus forming a journal for said main portion of said shaft,
   a pivot bearing, rigidly secured to a fixed vehicle part,
   a trunnion in the form of a solid of revolution, said trunnion rotatably engaging said pivot bearing, and
   an auxiliary retainer rigidly secured to a fixed vehicle part and spaced from said pivot bearing, said auxiliary retainer having a bore adapted to receive the end of said shaft opposite said journal, said bore being provided with an entrance slot,
   said journal being rotatably mounted within said trunnion, said trunnion being constrained to rotate in a single plane with respect to said pivot bearing, said plane being defined by a line coinciding with the axis of said journal and the center line of the bore of said auxiliary retainer.

2. A light shield assembly according to claim 1, wherein the entrance slot of the bore in said auxiliary retainer lies within the plane of rotation of said trunnion relative to said pivot bearing.

3. A light shield assembly according to claim 1, wherein the entrance slot of the bore in said auxiliary retainer lies within a plane at right angles to the plane of rotation of said trunnion relative to said pivot bearing.

4. A light shield as claimed in claim 1, characterized in that the solid of revolution is an ellipsoid of revolution, thereby effecting constraint of the rotation of said trunnion within said single plane.

5. A light shield as claimed in claim 1, characterized in that the solid of revolution consists of a circular cylinder, thereby effecting constraint of the rotation of said trunnion within said single plane.

6. A light shield as claimed in claim 1, characterized in that the solid of revolution has a rib, which is guided in a suitably shaped annular groove of the pivot bearing, said rib serving to effect constraint of rotation of said trunnion within said single plane.

References Cited

UNITED STATES PATENTS

| | | | |
|---|---|---|---|
| 2,156,091 | 4/1939 | Jacobs | 287—14 X |
| 2,698,728 | 1/1955 | Hedeen | 296—97 |
| 2,917,186 | 12/1959 | Beets | 296—97 X |
| 2,939,741 | 1/1960 | Keating | 296—97 |
| 3,017,217 | 1/1962 | Keating | 296—97 |
| 3,035,864 | 5/1962 | Davidson | 296—97 |

FOREIGN PATENTS 103,263   2/1937   Australia.

BENJAMIN HERSH, *Primary Examiner.*

J. A. PEKAR, *Assistant Examiner.*